(12) United States Patent
Herbig et al.

(10) Patent No.: US 8,021,731 B2
(45) Date of Patent: Sep. 20, 2011

(54) ADHESIVE SHEET AND METHOD

(75) Inventors: David N. Herbig, Bellevue, WA (US);
Christopher A. Smith, Issaquah, WA (US)

(73) Assignee: Badge Magic, LLC, Bellevue, WA (US)

( * ) Notice: Subject to any disclaimer, the term of this patent is extended or adjusted under 35 U.S.C. 154(b) by 980 days.

(21) Appl. No.: 11/578,436

(22) PCT Filed: Apr. 12, 2005

(86) PCT No.: PCT/US2005/012380
§ 371 (c)(1),
(2), (4) Date: Nov. 13, 2007

(87) PCT Pub. No.: WO2005/105442
PCT Pub. Date: Nov. 10, 2005

(65) Prior Publication Data
US 2009/0081399 A1    Mar. 26, 2009

Related U.S. Application Data

(60) Provisional application No. 60/562,104, filed on Apr. 14, 2004.

(51) Int. Cl.
*B32B 9/00* (2006.01)
*B32B 33/00* (2006.01)

(52) U.S. Cl. ............... 428/40.1; 428/41.7; 428/41.8; 428/42.1; 428/343; 428/346; 428/347; 428/349; 428/352; 428/355 R; 428/355 AC; 428/355 N; 283/117; 40/124; 40/191; 40/638; 40/642.02

(58) Field of Classification Search ............... 428/40.1, 428/41.7, 41.8, 42.1, 343, 346, 347, 349, 428/352, 355 R, 355 AC, 355 N; 283/117; 40/124.191, 638, 642.02, 657
See application file for complete search history.

(56) References Cited

U.S. PATENT DOCUMENTS

| | | | |
|---|---|---|---|
| 2,755,576 A | 7/1956 | Golden | |
| 3,651,818 A | 3/1972 | Vargo | |
| 3,996,679 A | 12/1976 | Warneke | |
| 4,128,194 A | 12/1978 | Hinz | |
| 4,802,602 A | 2/1989 | Evans et al. | |
| 5,160,315 A | 11/1992 | Heinecke et al. | |
| 5,202,169 A | 4/1993 | Spendlove | |
| 5,209,514 A * | 5/1993 | Hebert | 283/81 |
| 5,351,868 A | 10/1994 | Beletsky et al. | |
| 5,611,160 A | 3/1997 | Topitzes | |

(Continued)

FOREIGN PATENT DOCUMENTS

DE    2 236 153 A1    2/1974

(Continued)

OTHER PUBLICATIONS

Herbig, et al., "Adhesive Cutout," U.S. Appl. No. 11/716,083, filed Mar. 8, 2007.

*Primary Examiner* — Michael C Miggins
(74) *Attorney, Agent, or Firm* — Seed IP Law Group PLLC

(57) ABSTRACT

An adhesive sheet (10) for use in affixing a badge to a garment comprises a plurality of cutouts (18, 20, 22, 24), each cutout having a shape (19, 21, 23, 25) that approximately matches a shape of a badge.

19 Claims, 7 Drawing Sheets

U.S. PATENT DOCUMENTS

| | | |
|---|---|---|
| 5,617,587 A | 4/1997 | Marchbanks |
| 5,873,606 A * | 2/1999 | Haas et al. .................. 283/75 |
| 6,082,535 A | 7/2000 | Mitchell |
| 6,168,057 B1 | 1/2001 | Schwabe |
| 6,182,878 B1 | 2/2001 | Racca |
| 6,305,540 B1 | 10/2001 | Crawford et al. |
| 6,357,646 B1 | 3/2002 | Gur et al. |
| 6,441,092 B1 | 8/2002 | Gieselman |
| 6,533,150 B1 | 3/2003 | Margo et al. |
| 6,550,108 B2 | 4/2003 | Pratl |
| 6,612,432 B2 | 9/2003 | Motson |
| 6,691,323 B2 | 2/2004 | Widmer |
| 6,729,518 B2 | 5/2004 | Badillo et al. |
| 6,810,534 B2 | 11/2004 | Durkin et al. |
| 6,839,917 B1 | 1/2005 | Landwehr |
| 6,886,480 B2 | 5/2005 | Serrano |
| 6,895,261 B1 | 5/2005 | Palamides |
| 2002/0134809 A1 | 9/2002 | Angus et al. |
| 2004/0121798 A1 | 6/2004 | Hamasaki et al. |
| 2005/0084641 A1 | 4/2005 | Downs et al. |
| 2007/0295771 A1 | 12/2007 | Herbig et al. |

FOREIGN PATENT DOCUMENTS

| | | |
|---|---|---|
| DE | 4 319 023 C1 | 6/1994 |
| EP | 1 231 585 A2 | 8/2002 |
| WO | 03/053719 A2 | 7/2003 |
| WO | 2005/016064 A2 | 2/2005 |
| WO | 2005/067596 A2 | 7/2005 |
| WO | 2005105442 A1 | 11/2005 |

* cited by examiner

ADHESIVE SHEET AND METHOD

BACKGROUND OF THE INVENTION

1. Field of the Invention

The present disclosure is directed to an adhesive sheet and more particularly, to an adhesive sheet and method for adhering badges, patches and other emblems to garments, such as uniforms.

2. Description of the Related Art

Badges for uniforms, such as security badges, police badges, and Boy Scout badges, are typically sewn on to clothing, such as a uniform. Sewing is time consuming and, when badges are removed, can damage the clothing and/or the badge, reducing the ability to re-use the badge and the clothing.

Badges are also supplied with an adhesive pre-attached to the back of the badge. Such badges are more expensive than badges without pre-attached adhesive and more difficult to store. Such badges are also more difficult to modify than badges without pre-attached adhesive.

BRIEF SUMMARY OF THE INVENTION

In one aspect, an adhesive sheet for applying a badge to a garment comprises: a backing; an adhesive layer adhered to the backing; and a protective layer covering at least part of the adhesive layer, wherein the protective layer has at least one removeable cutout to facilitate exposing the adhesive layer, the removeable cutout having a perimeter shape approximately matching a perimeter shape of a badge.

In one embodiment, the adhesive sheet further comprises a marking identifying a badge. In one embodiment, the marking is a picture of a badge. In one embodiment the marking is an outline approximately matching a shape of a badge. In one embodiment, the marking is a readable badge identifier.

In one embodiment, the adhesive sheet further comprises a marking identifying a badge printed on the protective layer. In one embodiment, the adhesive further comprises a marking identifying a badge printed on an exposed surface of the protective layer. In one embodiment, the adhesive sheet further comprises a marking identifying a badge printed on a surface of the protective layer adjacent to the adhesive layer. In one embodiment, the adhesive sheet further comprises a marking identifying a badge printed on the adhesive layer. In one embodiment, the adhesive sheet further comprises a marking identifying a badge dyed into the adhesive layer.

In one embodiment, the protective layer has a plurality of removeable cutouts, each of the removable cutouts having a perimeter shape approximately matching a perimeter shape of a respective one of a plurality of badges.

In one embodiment, the adhesive layer comprises a reinforced acrylic adhesive. In one embodiment, the adhesive layer comprises a non-toxic adhesive. In one embodiment, the adhesive layer comprises a heat-settable adhesive. In one embodiment, the adhesive layer comprises a thermoplastic polyamide. In one embodiment, the adhesive layer comprises an adhesive that can be dissolved by a solvent. In one embodiment, the backing comprises silicon-coated polypropylene.

In another aspect, an adhesive sheet for affixing a badge to a garment comprises: a backing; and an adhesive layer carried on the backing, wherein the adhesive layer comprises a removeable cutout, the removeable cutout having a perimeter shape approximately matching a perimeter shape of a badge.

In one embodiment, the adhesive sheet further comprises a marking identifying a badge. In one embodiment, the marking is a picture of a badge. In one embodiment, the marking is an outline matching a shape of a badge. In one embodiment, the marking is a readable badge identifier.

In one embodiment, the adhesive sheet further comprises a marking identifying a badge printed on the adhesive layer. In one embodiment, the adhesive sheet further comprises a marking identifying a badge dyed into the adhesive layer.

In one embodiment, the adhesive layer has a plurality of removeable cutouts, each of the removable cutouts approximately matching a perimeter shape of a respective one of a plurality of badges.

In one embodiment, the adhesive layer comprises a reinforced acrylic adhesive. In one embodiment, the adhesive layer comprises a non-toxic adhesive. In one embodiment, the adhesive layer comprises a heat-settable adhesive. In one embodiment, the adhesive layer comprises a thermoplastic polyamide. In one embodiment, the adhesive layer comprises an adhesive that can be dissolved by a solvent. In one embodiment, the backing comprises silicon-coated polypropylene.

In one aspect, an adhesive sheet for affixing a badge to a garment comprises: an adhesive layer; means for carrying the adhesive layer; and means for identifying a portion of the adhesive to adhere to the badge. In one embodiment, the adhesive sheet further comprises means for protecting the adhesive layer. In one embodiment, the adhesive sheet further comprises means for providing instructions for use of the adhesive sheet.

In one aspect, a method of manufacturing an adhesive sheet for use in affixing a badge to a garment comprises: applying an adhesive layer to a backing; and segregating a plurality of portions of the adhesive layer, each segregated portion having a shape approximately matching a shape of a respective badge. In one embodiment, segregating a plurality of portions of the adhesive layer comprises applying a protective layer to the adhesive layer, the protective layer having a plurality of removable cutouts, each removable cutout having a shape approximately matching a shape of a respective badge. In one embodiment, segregating a plurality of portions of the adhesive layer comprises cutting a plurality of removable cutouts into the adhesive layer, each removable cutout having a shape approximately matching a shape of a respective badge. In one embodiment, the method further comprises applying a marking identifying a badge to the adhesive sheet. In one embodiment, the method further comprises applying use instructions to the adhesive sheet.

In one aspect, a method of affixing a badge to a garment comprises: exposing a segregated portion of an adhesive sheet, the segregated portion having a shape approximately matching a shape of the badge; applying a surface of the badge to the segregated portion of the adhesive sheet; removing the surface of the badge from the segregated portion of the adhesive sheet, such that at least some adhesive from the segregated portion of the adhesive sheet adheres to the surface of the badge; positioning the surface of the badge on a garment; and setting the at least some adhesive. In one embodiment, setting the at least some adhesive comprises applying heat.

In another aspect, a method of affixing a badge to a garment comprises: removing a pre-cut portion of adhesive from an adhesive sheet, the precut portion having a perimeter shape approximately matching a perimeter shape of the badge; placing the removed portion of adhesive on the garment; positioning a surface of the badge on the removed portion of adhesive; and setting the removed portion of the adhesive. In one embodiment, setting the removed portion of the adhesive comprises applying heat.

BRIEF DESCRIPTION OF THE SEVERAL VIEWS OF THE DRAWINGS

The size and relative positions of elements in the drawings are not necessarily drawn to scale. For example, the shapes of various elements are not drawn to scale, and some of these elements are arbitrarily enlarged and positioned to improve drawing legibility. Further, the particular shapes of elements, as drawn are not intended to convey any information regarding the actual shape of the particular elements, and have been solely selected for their ease and recognition in the drawings.

DETAILED DESCRIPTION OF THE INVENTION

In the following description, certain specific details are set forth in order to provide a thorough understanding of various embodiments. However, one skilled in the art will understand that the embodiments may be practiced without these details. In other instances, well-known structures associated with adhesives and backings, such as release liners, and automated equipment, such as printing presses and die cutting machinery, have not been described in detail to avoid unnecessarily obscuring the descriptions.

Unless the context requires otherwise, throughout the specification and claims which follow, the word "comprise" and variations thereof, such as "comprises" and "comprising" are to be construed in an open sense, that is as "including, but not limited to."

Figure 1:
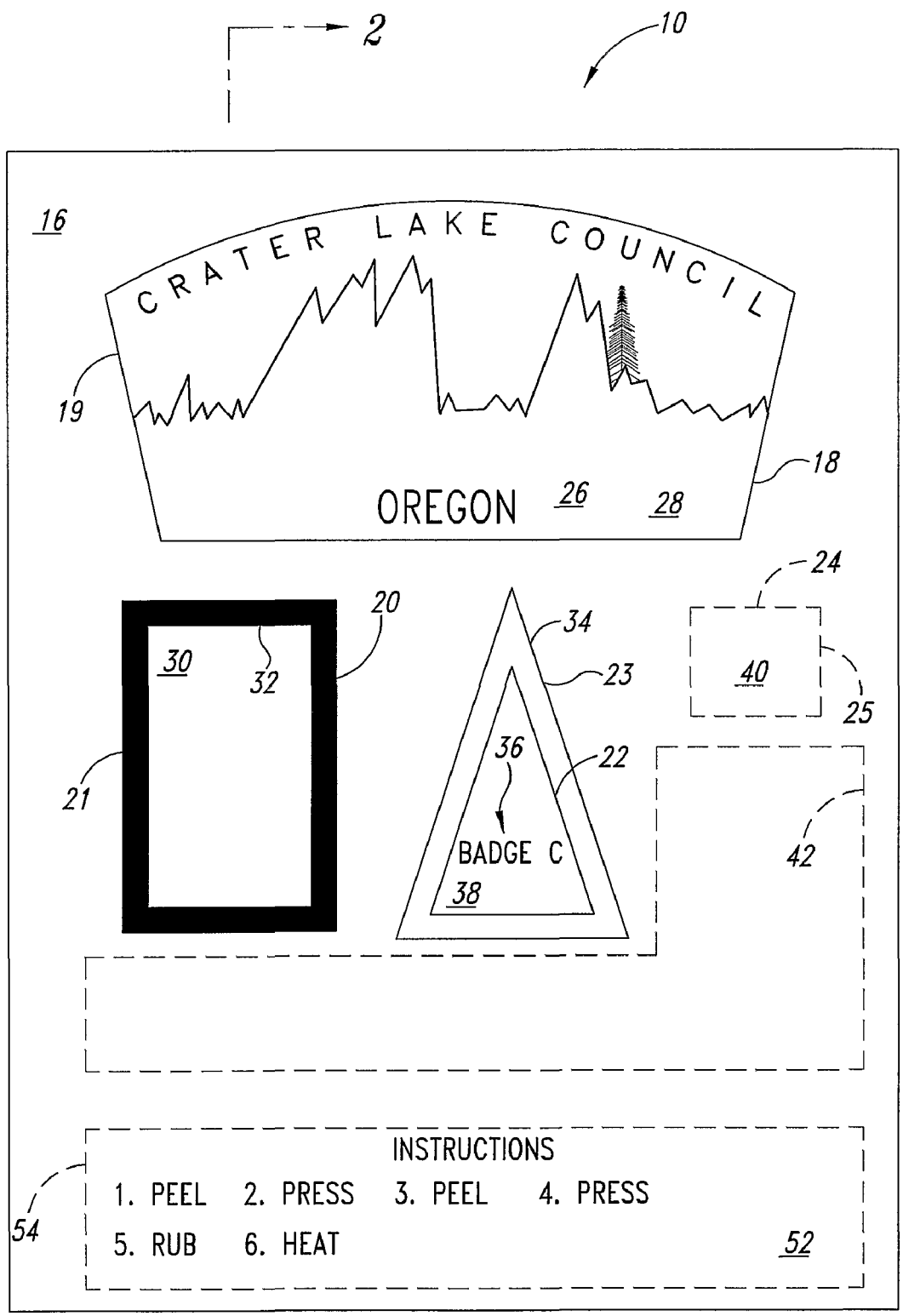
FIG. 1 is a top plan view of an adhesive sheet 10 according to one illustrated embodiment.
Figure 2:
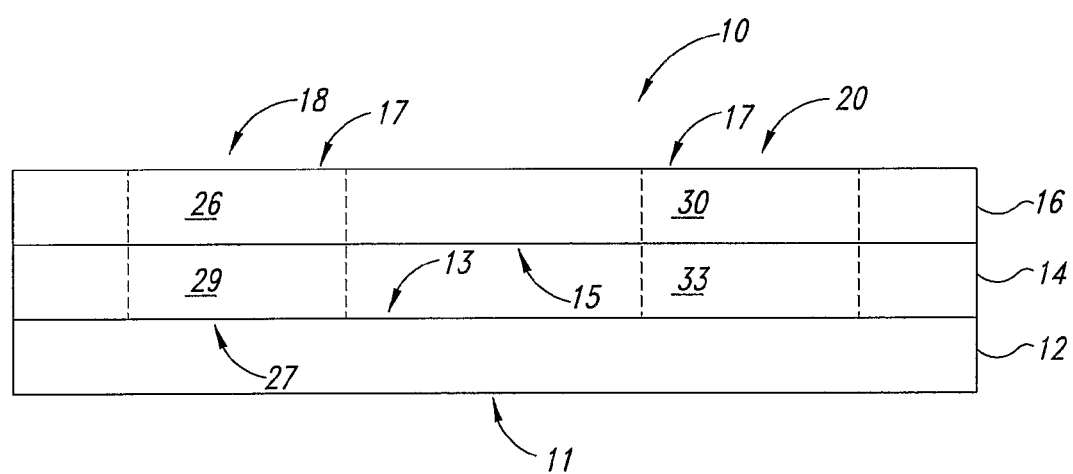
FIG. 2 is a cross-sectional side view of one embodiment of the adhesive sheet 10 of FIG. 1, taken along section line 2-2.

FIGS. 1 and 2 illustrate an adhesive sheet 10 for use in attaching badges to clothing. The adhesive sheet 10 has a backing 12, which has a first surface 11 and a second surface 13, and which may be made of, for example, silicone-impregnated paper, such as a kraft release liner with silicon-coated polypropylene. In some embodiments, the first and/or second surfaces 11, 13 of the backing 12 may be printed on.

The backing 12 carries adhesive layer 14 on the second surface 13 of the backing 12. The adhesive layer 14 comprises an adhesive, for example, a reinforced acrylic adhesive. In some embodiments, the adhesive is non-toxic. Some adhesives, such as reinforced acrylic adhesive, may benefit from application of heat to set the adhesive after the badge is affixed to a garment, as discussed in more detail below.

The adhesive sheet 10, or a portion thereof such as the backing 12 carrying adhesive layer 14, may be formed from pre-manufactured roles of silicon-impregnated paper with adhesive coatings.

A first surface 15 of a protective layer 16 is placed over the adhesive layer 14. In some embodiments, the first surface of the protective layer 16 may be printed on. The protective layer 16 may be made of any material such that the first surface 15 will adhere to the adhesive layer 14, but can be easily removed to expose a portion of the adhesive layer 14. In some embodiments, a second surface 17 of the protective layer can be printed on. Suitable materials for the protective layer 16 include paper that is silicon impregnated on the first surface 15. When silicon impregnated paper is used, the concentration of silicon on the first surface 15 of the protective layer 16 may be such that the adhesive layer 14 will remain adhered to the backing 12 when the protective layer 16 is removed.

Four removeable badge cutouts 18, 20, 22, 24 are formed in the protective layer 16, for example, by cutting, scoring, perforating, micro-perforating or otherwise forming a separation. The removable badge cutouts 18, 20, 22, 24 have perimeter shapes 19, 21, 23, 25 that approximately match perimeter shapes of corresponding badges (see FIGS. 3 to 6).

In some embodiments, a portion 26 of the protective layer 16 within the first badge cutout 18 may carry a marking, such as a picture or illustration 28 of a corresponding or similar badge (see FIG. 3), for example, printed or otherwise inscribed on the second surface 17. In some embodiments, a portion 26 of the protective layer 16 within the first badge cutout 18 may carry a marking, such as a picture or illustration 28 of a corresponding or similar badge (see FIG. 3), for example, printed or otherwise inscribed on the first surface 15. In such embodiments, the printing on the first surface 15 should be a least partially visible through the protective layer 16. In some embodiments, a portion 27 of the backing 12 within the first badge cutout 18 may carry a marking, such as a picture or illustration 28 of a corresponding or similar badge (see FIG. 3), for example, printed or otherwise inscribed on the surface 13 of the backing 12. In such embodiments, the printing on the surface 13 should be a least partially visible through the protective layer 16.

The picture or illustration 28 is illustrated in black and white, but some embodiments may employ a color picture or illustration. The portion 26 of the protective layer within the first badge cutout 18 may selectively be removed, to expose a segregated portion 29 of the adhesive layer 14 beneath the portion 26 of the first badge cutout 18.

In some embodiments, the marking may be a printed outline of a corresponding or similar badge printed on one or more of the first surface 11 of the backing 12, the second surface 13 of the backing 12, the first surface 15 of the protective layer 16 or the second surface 17 of the protective layer 16. For example, with reference to FIGS. 1, 2 and 4, a portion 30 of the second surface 17 of the protective layer 16 within the second badge cutout 20 may carry a printed outline 32. As illustrated, the printed outline 32 is black, but some embodiments may employ color. The portion 30 of the protective layer 16 within the second badge cutout 20 may selectively be removed to expose a portion 33 of the adhesive layer 14 located beneath the portion 30 of the protective layer 16 within the second badge cutout 20. In another example, with reference to FIGS. 1, 2 and 5, a printed outline 34 of a corresponding badge (see FIG. 5) may be printed or otherwise inscribed on the second surface 17 of the protective layer 16 just outside the third badge cutout 22. An optional human readable badge identifier 36 may be printed on a portion 38 of the second surface 17 of the protective layer 16 within the third badge cutout 22. The portion 38 of the protective layer 16 within the third badge cutout 22 may be selectively removed to expose a portion (not shown) of the adhesive layer 14.

Figures 4, 5, 6:
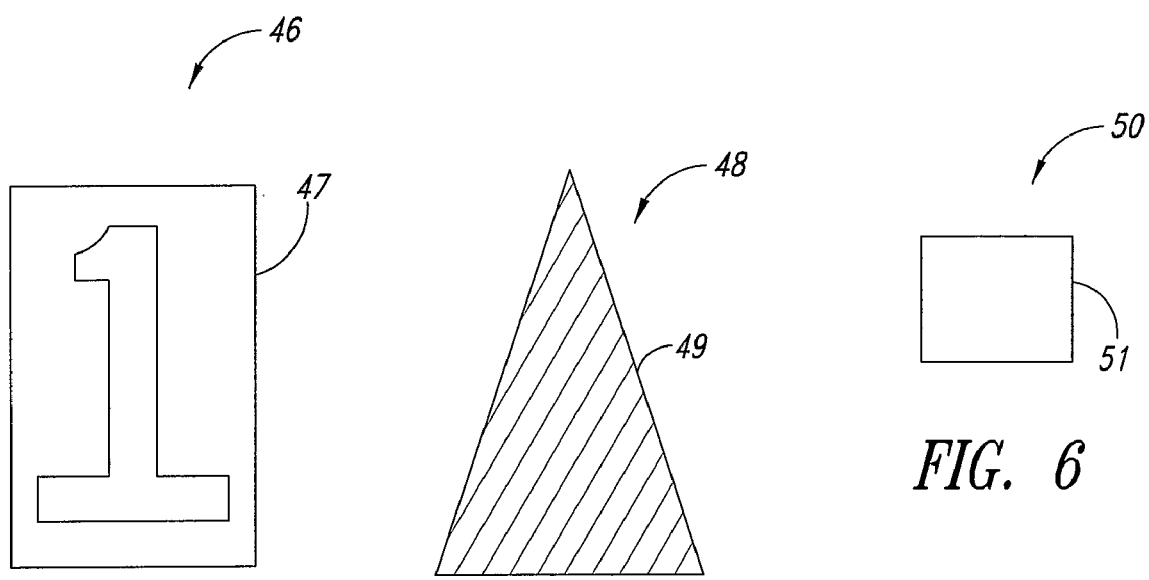
FIG. 4 is top plan view of another badge.
FIG. 5 is top plan view of another badge.
FIG. 6 is top plan view of another badge.

In another example, the fourth badge cutout 24 outlines a portion 40 of the protective layer 16 for a corresponding badge (see FIG. 6). The portion 40 of the protective layer 16 may be selectively removed to expose a portion (not explicitly called out in the figures) of the adhesive layer 14.

The adhesive sheet 10 has additional area, indicated by a dashed-line 42. This area 42 can be cut into shapes to match additional known or unknown badges (not shown), or with particular geometric shapes that may match or be combined to match unknown or future badges, or which may be used in making repairs. Instructions 52 for use of the adhesive sheet 10 are printed on the protective layer 16 in a region 54 indicated by dashed lines.

Various combinations of labeling, pictures, illustrations, outlines, cutouts and printing may be employed to facilitate matching of a badge (See FIGS. 3 to 6) with a corresponding or similar badge cutout, such as the first badge cutout 18 of FIG. 1.

FIGS. 4 to 6 illustrate various badges 44, 46, 48, 50 with perimeter shapes 45, 47, 49, 51 that approximately match the perimeter shapes of the badge cutouts 18, 20, 22, 24 illustrated in FIG. 1.

Figure 7:
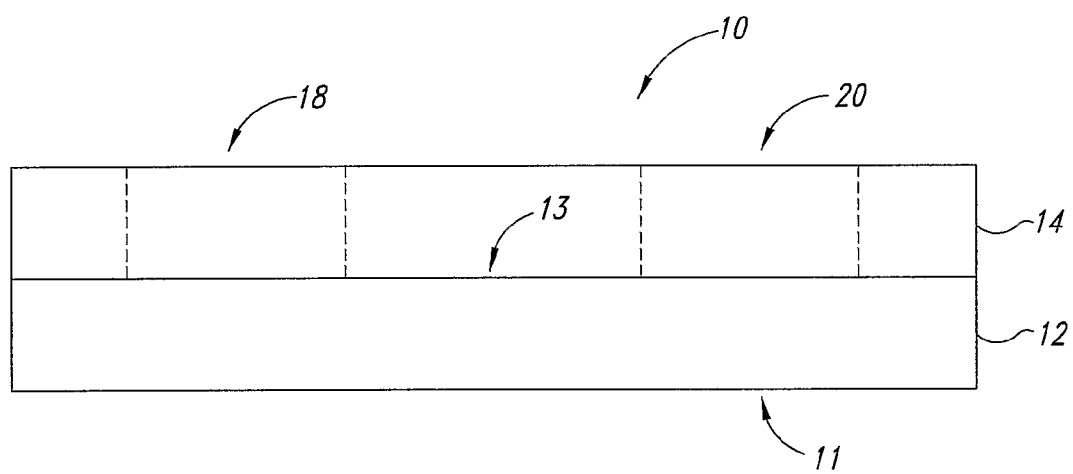
FIG. 7 is a cross-sectional view of an adhesive sheet 10 according to another illustrated embodiment.

FIG. 7 is a side view of an alternative embodiment of an adhesive sheet 10. The adhesive sheet 10 has a backing 12 with a first surface 11 and a second surface 13. A suitable backing may include, for example, silicon-impregnated paper. An adhesive layer 14 is applied to the backing 12. Suitable adhesive materials may include a thermoplastic polyamide. The adhesive layer has a first removable cutout 18 or segregated portion corresponding to a first badge shape (see also FIG. 1) and a second cutout 20 corresponding to a second badge shape (see also FIG. 1). The cutouts 18 and 20 segregate the cutout portions of the adhesive sheet. In some embodiments, the adhesive layer 14 may have a marking dyed or printed on it to indicate that a cutout matches a particular badge. In some embodiments, the first surface 11 and/or the second surface 13 of the backing 12 may have a marking to indicate that a cutout matches a particular badge.

After reviewing the specification, one of skill in the art will realize that adhesive sheets, such as adhesive sheet 10 shown in FIGS. 1, 2 and 7, may be sold separately or may be sold together with badges, such as the badges 44, 46, 48, 50 illustrated in FIGS. 4 to 6, as a kit.

Figure 8:
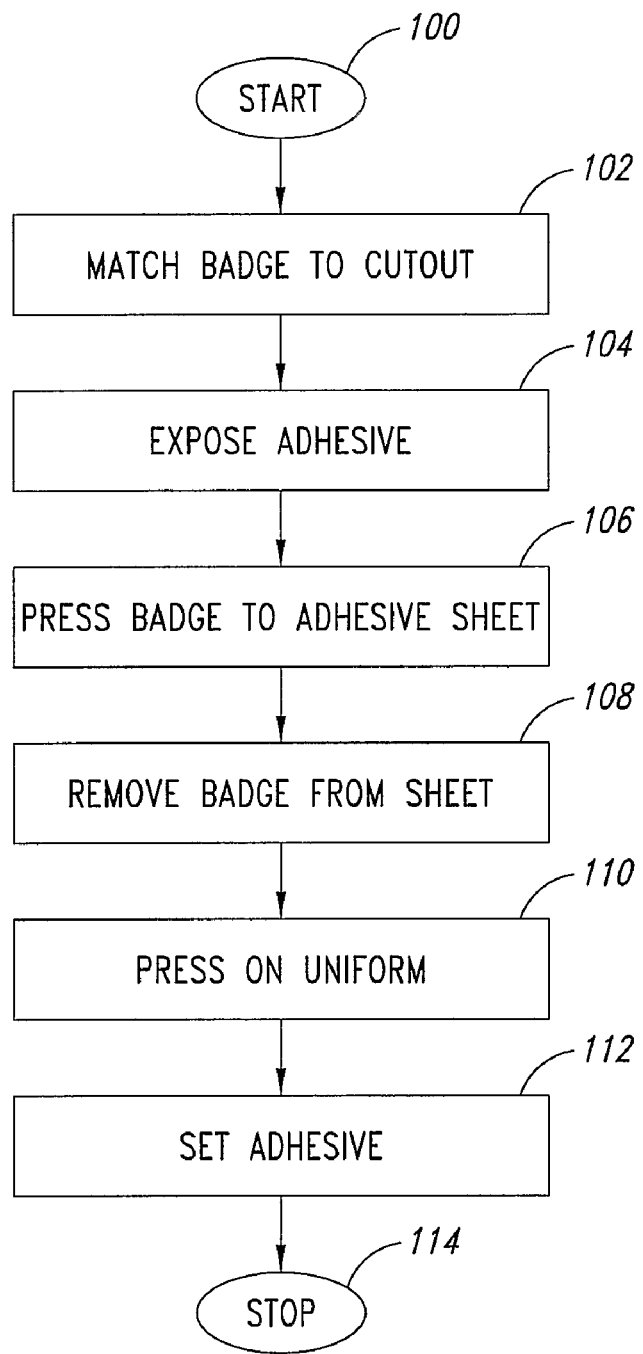
FIG. 8 is a flow diagram illustrating a method employing the adhesive sheet of FIGS. 1 and 2 to attach a badge to a garment, such as a uniform, according to one illustrated embodiment.

FIG. 8 shows a method employing an adhesive sheet to attach a badge, such as badges 44, 46, 48, 50 illustrated in FIGS. 4 to 6, to a garment, such as a uniform, according to one illustrated embodiment starting at 100. At 102, a badge, such as badge 44, is matched to a cutout on an adhesive sheet, such as the cutout 18 on the adhesive sheet 10 in FIG. 1. At 104, a portion 26 of the protective layer 16 is removed from the cutout 18, exposing a segregated portion 29 of the adhesive 14. In some embodiments, an edge of the portion 26 of the protective layer 16 in the cutout 18 can be bent up to facilitate removal. At 106, the back of the badge, such as the badge 44, is aligned with and pressed onto the exposed segregated portion (for example, the portion 29 of FIG. 2) of the adhesive 14 on the adhesive sheet 10. Rubbing the badge and adhesive sheet on both sides will facilitate adhering of at least some of the adhesive to the badge. At 108, the badge 44 is removed from the adhesive sheet 10, with a least some of the adhesive from the segregated portion 29 adhering to the badge. At 110, the badge 44 is pressed into place on a garment, such as a uniform. The badge 44 may be pressed into a place on the garment in accordance with placement guidelines. At 112, the adhesive is set by, for example, exposing the garment to heat. The heat may be supplied, for example, by an iron or by tossing the garment into a clothes dryer. The method terminates at 114.

Figure 3:
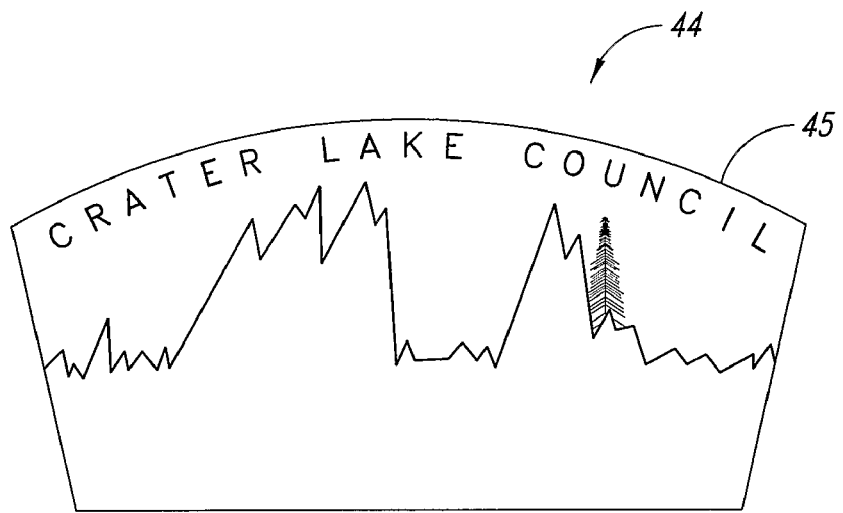
FIG. 3 is a top plan view of a badge.
Figure 9:
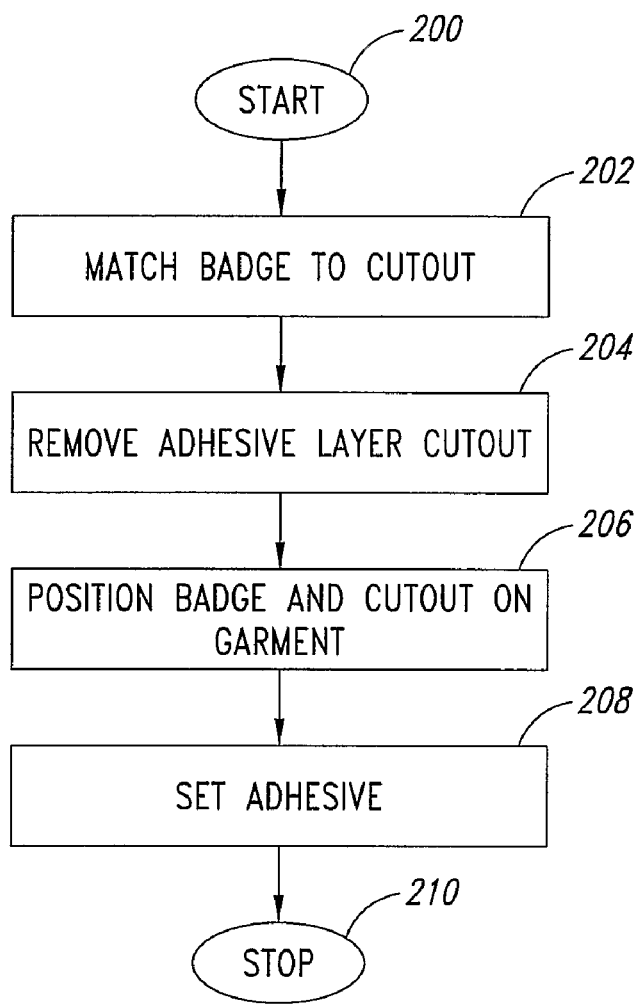
FIG. 9 is a flow diagram illustrating a method employing the adhesive sheet of FIG. 7 to attach a badge to a garment, such as a uniform, according to another illustrated embodiment.

FIG. 9 shows a method employing an adhesive sheet to attach a badge to a garment according to another embodiment starting at 200, discussed with respect to FIGS. 1, 3 and 7. At 202, a badge, such as badge 44, is matched to a cutout on an adhesive sheet, such as the cutout 18 on adhesive sheet 10 in FIG. 7. At 204, an adhesive layer cutout 18 is removed from the adhesive sheet 10. At 206, the adhesive layer cutout 18 is positioned between the back of the badge 44-50 and a desired location on the garment. At 208 the adhesive in the adhesive cutout 18, 20 is set, for example, by ironing the badge and adhesive cutout 18, 20 onto the garment. The method terminates at 210.

A dissolvable adhesive may be used in the adhesive layer, such as layer 14 of FIG. 2 or layer 14 of FIG. 7. This would facilitate reuse of the garments and the badges. For example, reinforced acrylic adhesive dissolves when exposed to dry-cleaning fluid and other solvents. Thus, in some embodiments a badge 44-50 may be removed by either dry-cleaning the garment or by exposing the garment to a solvent. In addition, a thermoplastic, if used in the adhesive layer, can be reheated to facilitate removal of a badge 44-50 from a garment.

Figure 10:
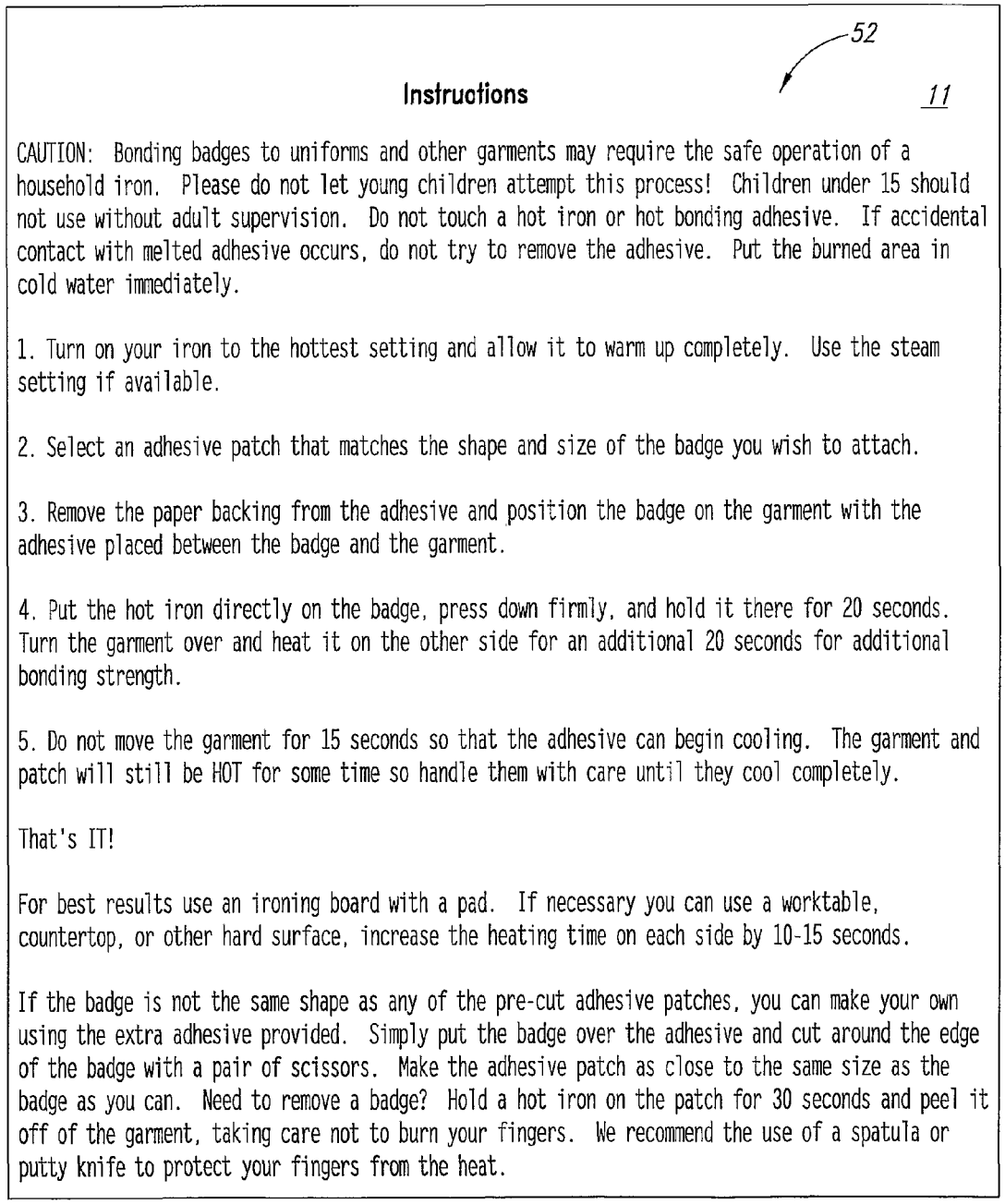
FIGS. 10 and 11 illustrate example instructions that may be provided for use with embodiments.
Figure 11:
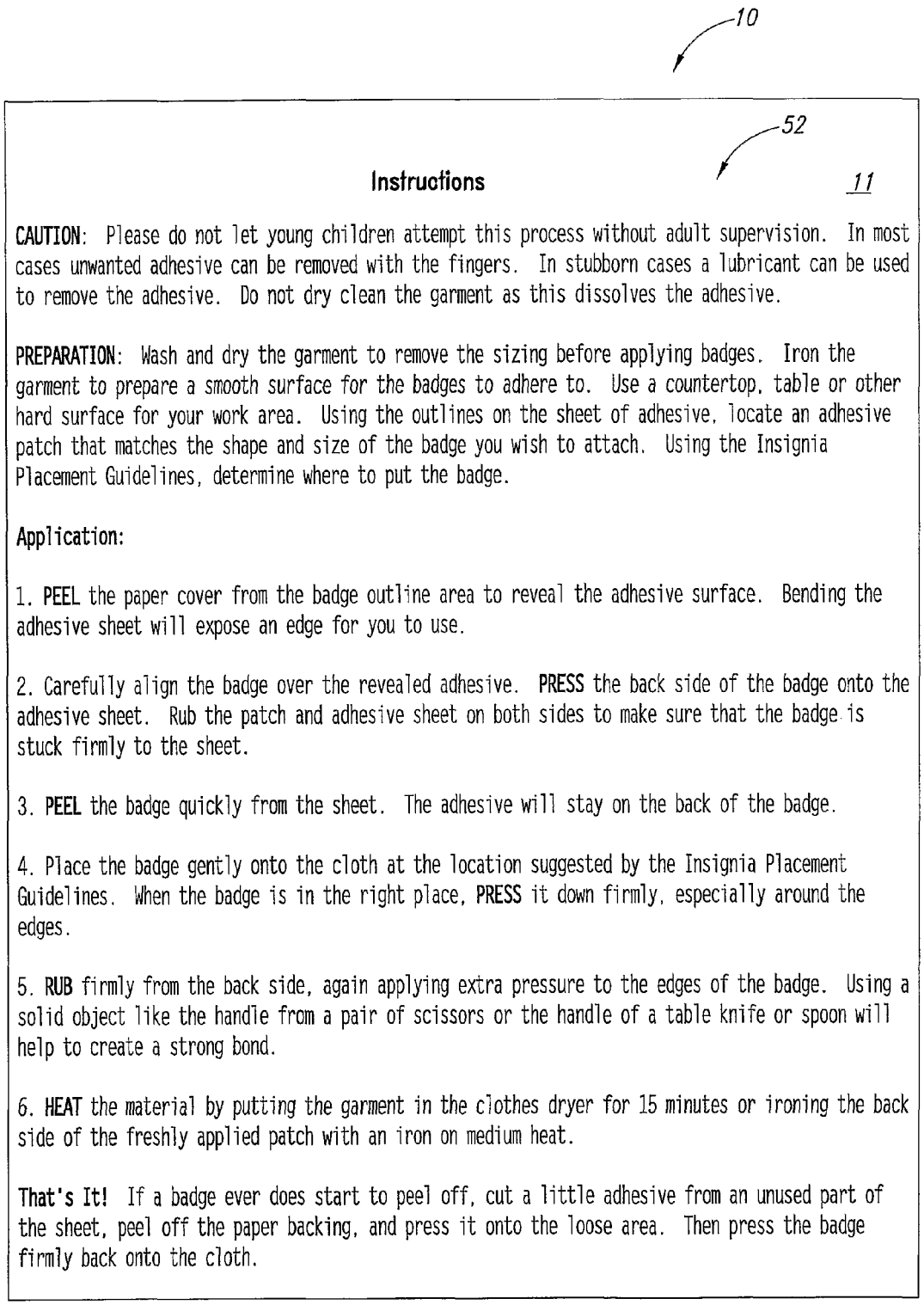

FIGS. 10 and 11 illustrate example instructions 52 that may be provided for use with embodiments, and that may be printed, for example, on the first surface 11 of the backing 12 of an adhesive sheet 10. In some embodiments, a separate instruction sheet may be provided. In some embodiments, instructions may be printed on a surface of a protective layer, such as the first surface 15 or the second surface 17 of the protective layer 16 in FIG. 2. In some embodiments, the instructions may be printed on the second surface 13 of the backing 12. In some embodiments, the instructions may be printed on or dyed into an adhesive layer, such as the adhesive layer 14 of FIG. 2.

The embodiments discussed above advantageously provide a highly flexible way to organize and distribute badges for use on uniforms. For example, an organization may have multiple local chapters or even individual members, each of which has one or more badges with similar shapes, but with slightly different details on the face of the badges. Each local chapter or individual can stock the same adhesive sheets, which reduces costs, for use with low-cost badges.

Some badges may have a backing attached. The backing may be removed to facilitate attachment of the badge using the embodiments discussed above.

From the foregoing it will be appreciated that, although specific embodiments have been described herein for purposes of illustration, various modifications may be made without deviating from the spirit and scope of the disclosure.

The invention claimed is:

1. An adhesive sheet for applying a badge to a garment, the adhesive sheet comprising:
    a backing;
    an adhesive layer adhered to the backing; and
    a protective layer covering at least part of the adhesive layer,
    wherein the protective layer has a plurality of removeable cutouts to facilitate exposing the adhesive layer, each removeable cutout of the plurality of removable cutouts having a perimeter shape approximately matching a respective badge perimeter shape.

2. The adhesive sheet of claim 1, further comprising:
    a marking identifying a badge and printed on the protective layer.

3. The adhesive sheet of claim 1, further comprising:
a marking identifying a badge and printed on an exposed surface of the protective layer.

4. The adhesive sheet of claim 1, further comprising:
a marking identifying a badge and printed on a surface of the protective layer adjacent to the adhesive layer.

5. The adhesive sheet of claim 1, further comprising:
a marking identifying a badge and printed on the adhesive layer.

6. The adhesive sheet of claim 1, further comprising:
a marking identifying a badge and dyed into the adhesive layer.

7. The adhesive sheet of claim 1 wherein the adhesive layer comprises a reinforced acrylic adhesive.

8. The adhesive sheet of claim 1 wherein the adhesive layer comprises a non-toxic adhesive.

9. The adhesive sheet of claim 1 wherein the adhesive layer comprises a heat-settable adhesive.

10. The adhesive sheet of claim 1 wherein the adhesive layer comprises a thermoplastic polyamide.

11. The adhesive sheet of claim 1 wherein the adhesive layer comprises an adhesive that can be dissolved by a solvent.

12. The adhesive sheet of claim 1 wherein the backing comprises silicon-coated polypropylene.

13. The adhesive sheet of claim 1, further comprising:
an instruction printed on the protective layer.

14. The adhesive sheet of claim 1, further comprising:
a marking identifying a badge.

15. The adhesive sheet of claim 14, wherein the marking is a picture of a badge.

16. The adhesive sheet of claim 14, wherein the marking is an outline approximately matching a shape of a badge.

17. The adhesive sheet of claim 14, wherein the marking is a readable badge identifier.

18. An adhesive sheet, comprising:
an adhesive layer;
means for carrying the adhesive layer; and
means for identifying a plurality of portions of the adhesive layer each having a perimeter shape matching a respective badge perimeter shape.

19. The adhesive sheet of claim 18, further comprising:
means for providing instructions for use of the adhesive sheet.

* * * * *